(12) United States Patent
Rist et al.

(10) Patent No.: US 9,319,436 B2
(45) Date of Patent: Apr. 19, 2016

(54) METHOD FOR INTEGRATING FUNCTIONS OF A TELECOMMUNICATIONS NETWORK IN A DATA NETWORK

(75) Inventors: Claus Rist, Bochum (DE); Sebastian Cordes, Lippstadt (DE)

(73) Assignee: Unify GmbH & Co. KG, Munich (DE)

( * ) Notice: Subject to any disclaimer, the term of this patent is extended or adjusted under 35 U.S.C. 154(b) by 261 days.

(21) Appl. No.: 13/988,426

(22) PCT Filed: Dec. 22, 2011

(86) PCT No.: PCT/EP2011/006513
§ 371 (c)(1),
(2), (4) Date: Aug. 8, 2013

(87) PCT Pub. No.: WO2012/084249
PCT Pub. Date: Jun. 28, 2012

(65) Prior Publication Data
US 2013/0315231 A1  Nov. 28, 2013

(30) Foreign Application Priority Data

Dec. 23, 2010 (EP) ................................. 10016048
Aug. 8, 2011 (EP) ................................. 11006516

(51) Int. Cl.
| | |
|---|---|
| *H04L 12/66* | (2006.01) |
| *H04L 29/06* | (2006.01) |
| *H04Q 3/62* | (2006.01) |

(52) U.S. Cl.
CPC .............. *H04L 65/1016* (2013.01); *H04Q 3/62* (2013.01); *H04Q 2213/1322* (2013.01);

(Continued)

(58) Field of Classification Search
CPC ...... H04M 3/56; H04M 7/006; H04L 65/403; H04L 12/1818; H04L 29/06027; H04L 65/1069; H04L 65/1006; H04L 65/80; H04L 65/1016
USPC .................................................. 370/262, 352
See application file for complete search history.

(56) References Cited

U.S. PATENT DOCUMENTS 6,731,609 B1 * 5/2004 Hirni et al. ..................... 370/260
2004/0213400 A1 * 10/2004 Golitsin et al. .......... 379/265.12

(Continued)

FOREIGN PATENT DOCUMENTS

| DE | 10159636 A1 | 10/2005 |
|---|---|---|
| EP | 1345457 A1 | 9/2003 |

(Continued)

OTHER PUBLICATIONS

International Preliminary Report on Patentability and Written Opinion for PCT/EP2011/006513 dated Jul. 4, 2013 (German Translation).
International Preliminary Report on Patentability and Written Opinion for PCT/EP2011/006513 dated Jul. 4, 2013 (English Translation).

(Continued)

*Primary Examiner* — Andrew Chriss
*Assistant Examiner* — Atique Ahmed
(74) *Attorney, Agent, or Firm* — Buchanan Ingersoll & Rooney PC (57) ABSTRACT

In a method for integrating functions of a telecommunications network (TN) in a data network (DN), a switching System (PBX) of the telecommunications network is connected to an IM Server (XS) of the data network via a device (CCGW), with the aid of which the IM Server is rendered capable of providing Computer telephony integration Services of the switching System (PBX) to a Communications subscriber of the data network.

20 Claims, 5 Drawing Sheets

(52) U.S. Cl.
CPC ............... *H04Q 2213/13034* (2013.01); *H04Q 2213/13093* (2013.01); *H04Q 2213/13196* (2013.01); *H04Q 2213/13204* (2013.01); *H04Q 2213/13389* (2013.01)

(56) References Cited

U.S. PATENT DOCUMENTS

| | | | | |
|---|---|---|---|---|
| 2007/0255809 | A1* | 11/2007 | Chiba | 709/219 |
| 2009/0248797 | A1* | 10/2009 | Chiba et al. | 709/203 |
| 2011/0026517 | A1* | 2/2011 | Capuozzo et al. | 370/352 |
| 2011/0258305 | A1* | 10/2011 | Chen et al. | 709/223 |
| 2013/0272191 | A1* | 10/2013 | Witzel | H04L 12/5815 370/315 |

FOREIGN PATENT DOCUMENTS

| | | |
|---|---|---|
| EP | 2224667 A1 | 9/2010 |
| WO | 9851092 A1 | 11/1998 |
| WO | 02080493 A1 | 10/2002 |
| WO | 2007041441 A1 | 4/2007 |

OTHER PUBLICATIONS

Written Opinion of the International Searching Authority for PCT/EP2011/006513 dated May 23, 2012 (Form PCT/ISA/237) (German Translation).

International Search Report for PCT/EP2011/006513 dated May 23, 2012 (Forms PCT/ISA/220, PCT/ISA/210) (German Translation).

* cited by examiner

METHOD FOR INTEGRATING FUNCTIONS OF A TELECOMMUNICATIONS NETWORK IN A DATA NETWORK

CROSS REFERENCE TO RELATED APPLICATIONS

This application is the United States national phase under 35 U.S.C. §371 of PCT International Patent Application No. PCT/EP2011/006513, filed on Dec. 22, 2011 and claiming priority to European Application No. 10016048.0 filed on Dec. 23, 2010, and European Application No. 11006516.6, filed on Aug. 8, 2011.

BACKGROUND OF THE INVENTION

1. Field of the Invention

Embodiments relate to methods for integrating functions of a telecommunications network into a data network.

2. Background of the Related Art

Telecommunications networks are used primarily for communication by telecommunication subscribers using telecommunication terminals such as telephones. Data networks are used primarily for networking computers, for example PCs with servers. Methods and devices whereby applications installed on computers control and monitor communication systems and communications connections are generally known as CTI solutions (CTI=Computer Telephony Integration). Both communication system ports and connections between ports can be controlled and monitored in this manner. The respective connections are temporary communication channels between two or more subscribers to one or more communication systems.

During operation of a CTI solution, data containing control and status information are transferred between a communication system and a CTI application (CTI application program). To this end, communication systems have special interfaces for the data exchange, the CTI interfaces. The respective applications or PCs likewise have corresponding CTI interfaces for this data exchange. For this purpose, the CTI interfaces of the communication system and those of the application are connected to each other via a data line or via a data network. Because the maximum number of CTI interfaces in a communication system is limited, a telephony server is often connected between the communication system and the applications.

Publication WO 98/51092 A1 "Computer telephony integration gateway" shows a public communications network with multiple communication systems and a private communications network with several domains, each having computers with applications for controlling and/or monitoring resources of the public communications network. The arrangement shown has a "CTI Gateway" acting as the conversion device, which modifies the data transmitted from the public communications network to the private communications network for the purpose of controlling and/or monitoring resources, such that these data appear as the data for one single public communication system, and conversely modifies the data transmitted by the private communications network together with the applications to the public communications network, such that they appear to have been transmitted from a private communication network with only one application.

DE 000010159636 B4 describes a method for controlling and/or monitoring resources and connections using the exchange of data between communication systems and at least one application, wherein the data have identifiers that differentiate the resources and the connections, and the identifiers of the resources are converted during the exchange such that they present themselves as the identifier of one single communications system with subscriber connections for the one or for each application, characterized in that each of the identifiers of the connection between resources of different communications systems comprises one local connection number (call ID) of the communication system that participates in the connection and a global connection number (call ID) and in that through the conversion the global connection number (call ID) is transmitted to the application such that it cannot be differentiated by the application from a local connection number (call ID).

BRIEF SUMMARY OF THE INVENTION

According to embodiments of the invention, a method is provided for integrating functions of a telecommunications network into a data network, where a switching system (PBX) of the telecommunications network is connected to an IM server (XS) of the data network via a device (CCGW) with the aid of which the IM server is rendered capable of providing the computer telephony integration services of the switching system (PBX) to a communications subscriber of the data network.

Preferably, the XMPP client subscribes to CTI services via the XMPP server, preferably at a PBX (private branch exchange), which provides the functionality of these services preferably via a call control gateway (CCGW). The CCGW is a preferred connection between the CTI of a PBX and the XMPP server. Since CSTA (Computer Supported Telecommunications Applications) requires a unique InvokeID for each service, the initial problem to be solved is the conversion of a client-specific CSTA InvokeID generated via XMPP to a unique CSTA-specific InvokeID. To solve this problem, the CSTA-specific InvokeID is preferably mapped to the Tupple Jabber ID (JID) of the XMPP client and the XMPP SessionID. This mapping makes it possible to obtain a unique correlation to the CSTA InvokeID without XMPP having to transfer and synchronize the CSTA InvokeID.

DETAILED DESCRIPTION OF THE INVENTION

Embodiments of the invention are linked to functionality and user interface advantages. The dynamic mapping of CTI services within an XMPP environment allows for third party call control in the XMPP environment. Manual control corrections are no longer required. Compared to the prior art, this simplified presence administration and CTI integration saves time and associated costs.

In this context, a telecommunications network refers to an arrangement that supports communication by subscribers via so-called switching systems. Important examples of such telecommunications networks are networks using circuit switching, in particular telephone networks. In the telecommunications field, circuit switching (also referred to as line switching) refers to a switching technology method wherein a connected transmission channel with a constant bandwidth is temporarily correlated to a communications connection and is then available to that connection for exclusive use, even when no information is transmitted. The best-known network that establishes connections using circuit switching is the classic telephone network.

As a rule, the connection is established based on the target information entered by the calling terminal before the actual communication can begin. When communication is finished, the connection is terminated. Switching systems control the establishment and termination of communications connections. For this purpose, they exchange control information with or between the terminals, which is referred to as signaling. This control information is used for the tasks of path finding, traffic control and switching network connections.

Since switching systems learn all required information during the time of establishing the connection, messages do not need to be stored at intermediate stations and forwarded once the connection has been established and do not need to contain additional target information. Circuit switching has the advantage that service quality with regard to transfer speed can be maintained at all times and that signal run times are constant, i.e., the only delays that occur between transmitter and receiver are of known and constant durations. However, establishing the connection is time-intensive.

Communication connections with multiple partners require repeated set-up and both participants must transmit and receive with equal capacity.

A virtual circuit can be based on packet switching technology and the emulation of circuit switching. Using this method, a connection is established and the packets are transmitted in the correct sequence.

Mechanisms that are more sophisticated than circuit switching use packet switching, where a transmission channel is not used exclusively for one communications connection but simultaneously for multiple connections. Earlier packet networks such as Datex-P use a combination of circuit and packet switching.

In this context, the term data network refers to a network for transmitting data between computers. Data networks operate preferably according to the principle of packet switching. Packet switching is a special method of message switching in a network. With this method, longer messages are separated into individual data packets and transmitted as datagrams via a previously established virtual connection. Thus, packet switching is a message switching method.

With packet switching, the packets traverse the network as independent and autonomous units and can be stored in switching nodes and then forwarded. This is a significant advantage because the transmission speed between individual distance segments no longer presents a restriction. However, the architecture appears as a network of waiting queues. Each network node that must be passed receives the packet and forwards it at its output interface, which can be the target of many transmissions, creating a tendency toward overload situations. The existence of waiting queues creates delays in packet delivery or packet losses, resulting in re-transmissions and thus additional strain on the transmission path. This process is transparent for the user. He needs and receives no information about the transmission path. As a rule, he will not be able to obtain this information because transmission paths change dynamically.

In this context, a switching system refers to a node within a telecommunications network. Significant examples of switching systems are switching devices in telephone networks, telephone systems or private branch exchanges.

In this context, an IM server refers to an instant messaging server or a functionally similar arrangement. Instant Messaging (abbreviated as IM) is a communication method wherein two or more subscribers communicate using text messages (also referred to as "chatting"). The transmission uses the push method so that messages reach the receiver in real time. To this end, the subscribers must be connected directly to each other via a network such as the Internet or via a server (the IM server or instant messaging server) using a computer program (the so-called "client"). Many clients additionally support the transmission of files and of audio and video streams. Users can keep track of each other in their contact lists and can use the presence information to see if the other is available for a conversation.

Significant examples of IM servers are XMPP servers. The Extensible Messaging and Presence Protocol (XMPP) (formerly Jabber) is an internet standard for XML routing published by the IETF as RFC 6120-6122 as well as 3922, 3923. XMPP follows the XML standard and is used primarily for instant messaging. XMPP extension protocols published by the XSF provide extensions to XMPP.

In this context, a computer telephony integration service refers to a service that links telecommunication with electronic data processing. Using a computer program, CTI enables automatic set-up, acceptance, and termination of telephone conversations, set-up of teleconferences, transmission and receipt of fax messages, phone book services, and communication forwarding.

Using automatic caller identification, the appropriate data set can be retrieved from a database and displayed with customer data on a screen. In addition, depending on the provider, CTI programs can maintain a journal of the conversations carried out. This technology is used primarily by call centers.

A differentiation is made between first-party call control and third-party call control. With first-party call control, the telephone is either integrated into the computer or connected directly to it. With third-party call control, a special server is typically switched between the computer network and the telephone network or telephone system and assumes control over the telephone. Computer telephony integration is a performance feature that is supported by many telephone systems.

Computer Supported Telecommunications Applications (CSTA) is the name of one of the ECMA-standardized protocol specifications that is used for data traffic between a telephone system and computer programs. Like many other protocols in telecommunication, the protocol specification is written in ASN.1. The CSTA protocol defines only the transferred data, not the transport layer. For coding the data stream, Basic Encoding Rules (CSTA Phase I, II and III) and XML Encoding Rules (CSTA Phase III) are used. The CSTA protocol can be transported via various media (serial, ISDN, TCP/IP).

The latest version is uaCSTA (ECMA Technical Report TR/87). This version, introduced for user agents, was created with a restricted scope that is used exclusively for XML encoding.

According to a preferred embodiment of the invention, which has features that can also be combined with the features of other embodiments, a method is provided with which the IM server is able to provide computer telephony integration services from the switching system (PBX) to a communication subscriber on the data network by enabling an IM client (XC) to subscribe to such Computer Telephony Integration Services from the switching system (PBX).

In this context, IM client (XC) or Instant Messaging client refers to a computer program, which, within the framework of an Instant Messaging Service, establishes contact with another computer program, the IM Server, in order to use this IM Server's services. The underlying client-server model allows the distribution of tasks to computers on a computer network, thus relieving many of the hosts from tasks. A client does not solve certain tasks by itself but instead has the tasks carried out by the server that offers its service for that purpose.

According to another preferred embodiment of the invention, which has features that can also be combined with features of other embodiments, a method is provided with which the device (CCGW) performs mapping between a CSTA-specific InvokeID (CSTA-11D) and a Jabber Identifier (JID) of the IM client and/or an XMPP SessionID (XSID).

In this context, a CSTA-specific InvokeID (CSTA-IID) refers to an identifier that is used within the scope of CSTA in order to link a request with a response (CSTA Services Interface Programming Guide.

In this context, a Jabber identifier refers to an identifier that enables addressing of an entity (here an actual user, a bot, an XMPP server, a service or a mixture thereof) within an XMPP network. It has the form alice@example.com/home and is similar to an email address: The first part of the address is the node (here, alice), which specifies a user name. It is optional but typically is missing only with servers or services. Then, separated by an "@," follows the domain (here, example.com, alternatively also the IP address), which determines the XMPP Server on which the account is registered. Also optional is the designation of a resource (here, home), which follows after a "/". This character string is freely selectable by the user.

A Jabber ID consisting of node and domain (for example in the form alice@example.com<alice@example.com>) is also referred to as a bare Jabber ID. If a resource is added to this bare Jabber ID (for example alice@example.com<alice@example.com>/home) then it is referred to as a full Jabber ID. "Below, the full Jabber identifier will be referred to as Jabber identifier, Jabber ID or JID for short."

According to another preferred embodiment of the invention, the features of which can also be combined with the features of other embodiments, a method is provided wherein the communication between the device (CCGW) and the IM Server is configured as a server-server connection.

According to another preferred embodiment of the invention, the features of which can also be combined with the features of other embodiments, a method is provided wherein the communication between the device (CCGW) and the IM Server is configured as a server-client connection.

According to another preferred embodiment of the invention, the features of which can also be combined with the features of other embodiments, a method is provided wherein the communication between the device (CCGW) and the IM Server is carried out via a server component according to XEP 0114 or another Jabber component protocol that is comparable to XEP 0114. The Jabber component protocol is defined in a document "XEP-0114: Jabber Component Protocol" of the XMPP Standards Foundation.

According to another preferred embodiment of the invention, the features of which can also be combined with the features of other embodiments, a method is provided wherein the so-called InvokeID is used to correlate a request to the associated response.

According to another preferred embodiment of the invention, the features of which can also be combined with the features of other embodiments, a method is provided wherein the InvokeID that is used to correlate a request to the associated response is unique across all requests.

The number of CSTA InvokeIDs is limited and is allocated cyclically. The uniqueness of this identifier results from the fact that a CSTA request is provided with a free InvokeID, the used InvokeID is then marked as in use and will not be used for another request as long as no CSTA response with the respective InvokeID has been received. After receiving a CSTA response, the InvokeID contained therein will be released and will be available for reuse.

According to another preferred embodiment of the invention, the features of which can also be combined with the features of other embodiments, a method is provided wherein IQ stanzas are used for CSTA transport via XMPP, said IQ stanzas having a request-response mechanism that is comparable to the response mechanism used by CSTA. The term XMPP IQ stanza is defined in greater detail in the document "Extensible Messaging and Presence Protocol (XMPP): Core of the Network Working Group of the Jabber Software Foundation.

According to another preferred embodiment of the invention, the features of which can also be combined with the features of other embodiments, a method is provided wherein an IM client generates an XMPP SessionID that is different from other XMPP SessionIDs for the same IM client.

Known XMPP-based client/server architectures run asynchronous to the telephone. Dynamic mapping of CTI services in the XMPP environment is not provided in this case. For XMPP-based client/server architectures, the telephone is transferred or connected (e.g., on phone) manually, if at all. Since CSTA requires a unique InvokeID for each individual service, the initial problem to be solved is the conversion of a client-specific CSTA InvokeID generated via XMPP to a unique CSTA-specific InvokeID.

To solve this problem, the CSTA-specific InvokeID is preferably mapped to the Tupple Jabber ID (JID) of the XMPP client and the XMPP SessionID. This mapping makes it possible to obtain a unique correlation to the CSTA InvokeID without having to transfer and synchronize the CSTA InvokeID within XMPP.

The switching system PBX and the XMPP server (XS) are connected using a Call Control Gateway (CCGW). The CCGW is the connection between the CTI of a PBX and the XMPP server. An XMPP client can subscribe to and provide CTI services via this call control gateway. In one embodiment, this involves the CSTA call control services and events described in ECMA-269.

Figure 1:
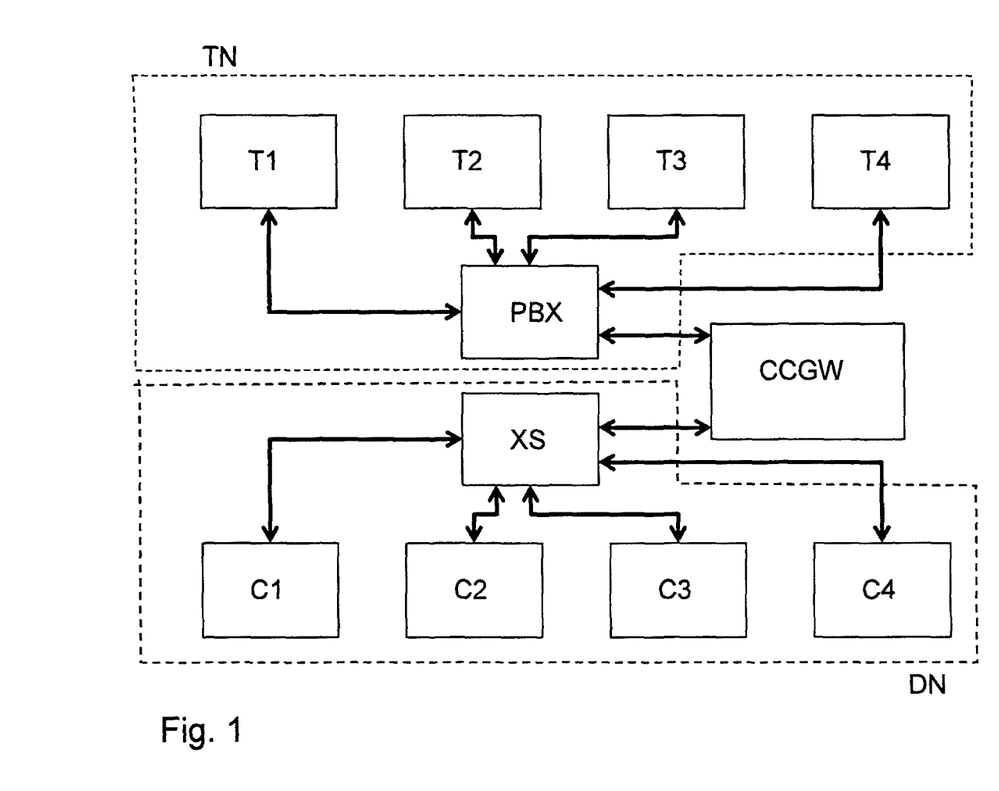
FIG. 1: schematically, a first arrangement of system components for carrying out an exemplary embodiment of a method according to invention.
Figure 2:
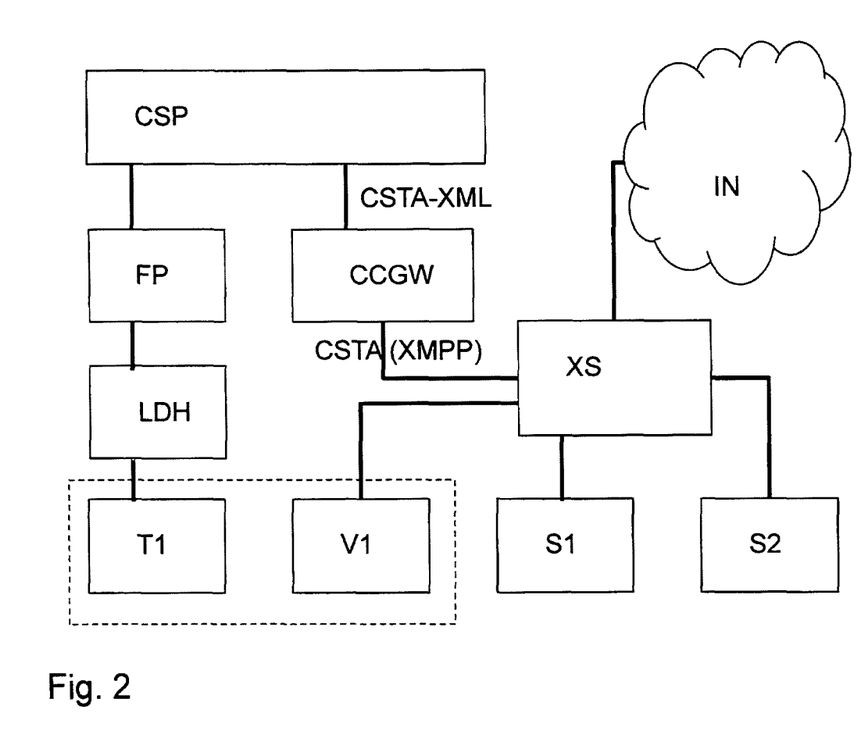
FIG. 2: schematically, a second arrangement of system components for carrying out an exemplary embodiment of a method according to invention.

FIGS. 1 and 2 show schematically the integration of the CCGW into the entire system. FIG. 2 specifically shows an integration of the CCGW into the entire system, configured using the example of OpenScape Office MX.

As shown in FIG. 1, functions of a telecommunications network TN in a data network DN, consisting of telecommunication terminals T1, T2, T3, T4 and a switching system PBX and potentially additional components, are integrated by connecting a switching system PBX from the telecommunications network to an IM server XS on the data network, where the clients C1, C2, C3 and C4 communicate via the IM server XS, via a device CCGW that is used to enable the IM server to provide computer telephony integration services from the switching system PBX to a communications subscriber on the data network.

On one side, the connection to Feature Processing FP is established for one via CSTA XML, here using a CSTA Service Provider (CSP). On the other side, CSTA is transmitted via XMPP to the XMPP Server XS. An XMPP client S1, S2 can subscribe to CTI services using CCGW. Communication between the CCGW and the XMPP server can be carried out as a server-server or server-client connection but also via a server component according to XEP 0114 or another Jabber component protocol comparable to XEP 0114.

In the example shown in FIG. 2, the IM server XS also establishes a connection between the clients S1, S2 and the Internet IN. V1 designates a visualization (i.e., the graphic preparation of potentially existing call forwards or the like, for example) of the communication on the terminal T1.

In CSTA (represented by the CSP in the exemplary embodiment according to FIG. 2), the so-called InvokeID is used to correlate a request to the associated response. This InvokeID should be unique across all requests to ensure error-free correlation.

IQ stanzas (XMPP IQ messages) with a similar request-response mechanism as is used by CSTA can be used to transport CSTA via XMPP. As with CSTA, an ID is used for mapping here as well and is referenced for XMPP as a SessionID. CSTA requests, which are transported from an XMPP client (referenced with S1, S2 in the exemplary embodiment according to FIG. 2) via XMPP, are received by the CCGW, and the CSTA message is taken from the IQ stanza, advantageously provided with a not-yet-used InvokeID, and transmitted to the CSP. In addition, the CCGW stores the full Jabber ID, the XMPP SessionID and the assigned CSTA InvokeID. This avoids transporting a CSTA InvokeID when transporting CSTA via XMPP, since the CCGW ensures that the CSTA InvokeIDs are unique between it and the CSP.

The combination of full Jabber ID, XMPP SessionID and CSTA InvokeID allows for unambiguous mapping of a CSTA message, which receives the CCGW from the CSP. Using mapping as described above allows for transmitting the CSTA responses to the XMPP client that also transmitted the CSTA request.

The XMPP SessionID mentioned above is generated by the XMPP client and can be selected freely. The only restriction when selecting the SessionID is the necessary uniqueness, which is required only for an XMPP client; different XMPP clients may use the same SessionID at the same time. When using full Jabber, XMPP IQ messages are transmitted to a client; otherwise, the XMPP server itself responds.

Figure 3:
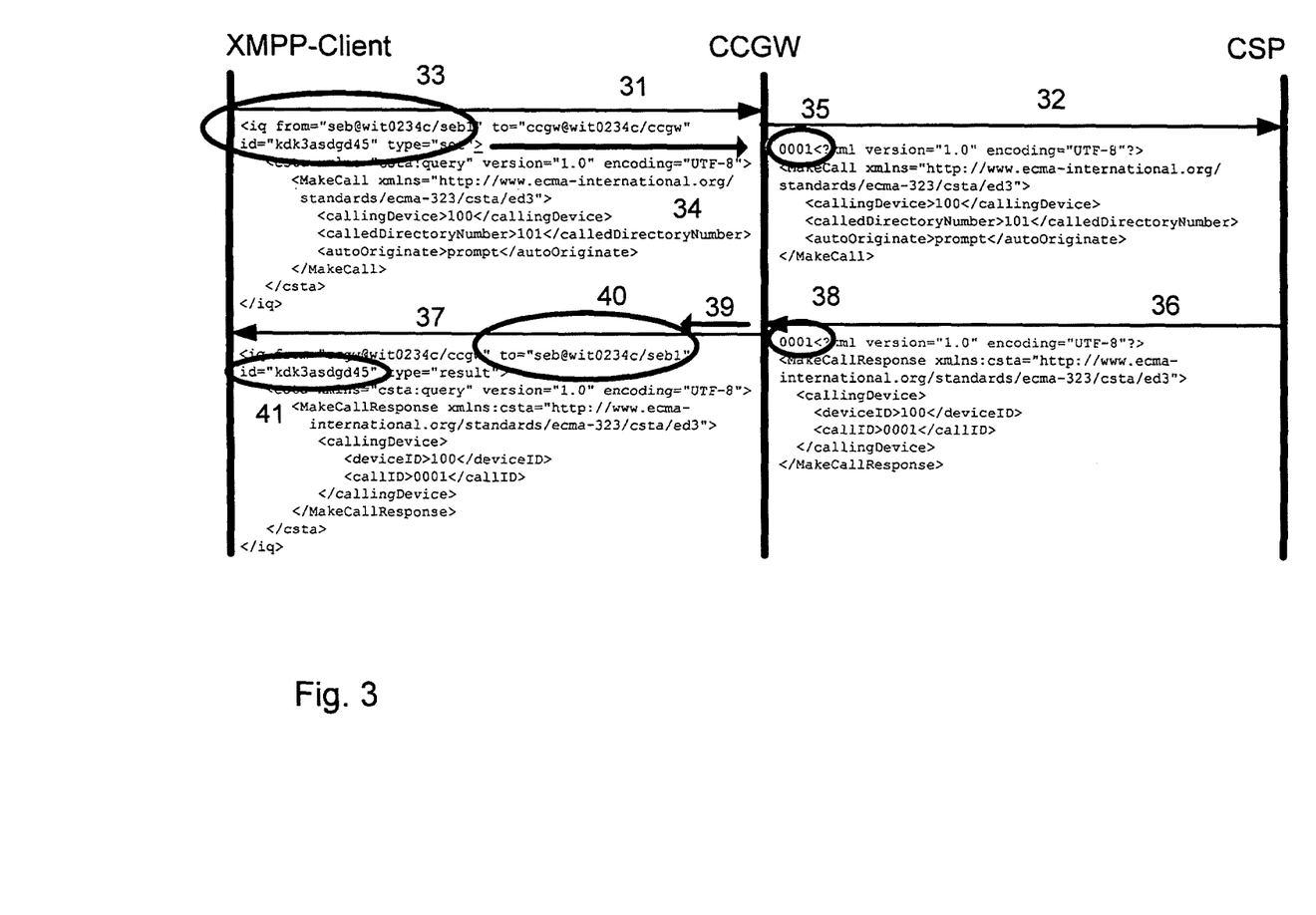
FIG. 3: schematically, the dynamic mapping of the XMPP Jabber ID and XMPP SessionID to the CSTA InvokeID using an exemplary embodiment of a method according to the invention.

In the exemplary embodiment shown in FIG. 3, dynamic mapping of the XMPP Jabber ID and the XMPP SessionID 33 to the CSTA InvokeID 35 is shown as an example. During communication 32 between the CCGW and the CSP, the CCGW assigns a CSTA InvokeID 35 to every CSTA. This CSTA InvokeID 38 is then present in the respective response 36 of the CSP in order to enable a unique correlation of the responses 37 to the associated request 31 for the CCGW. Since the CCGW is capable of communicating simultaneously with more than one XMPP client, a received response 36 should also be forwarded to the correct XMPP client.

To enable correct mapping of the CSTA services to the XMPP client, the CCGW carries out a mapping procedure between the CSTA InvokeID 35, 38 and the Tupple Jabber ID 40 and the SessionID 41 by assigning, to each incoming CSTA request 31 from an XMPP client, a CSTA InvokeID 35 for this request and storing it in connection with the Jabber ID 40 of the XMPP client and the SessionID 41 assigned by it. The CSTA request is then taken from the XMPP message, and the correlating CSTA InvokeID is added and transmitted to the CSP.

If the CCGW receives a CSTA response 36 from the CSP, the CSTA InvokeID 38 is separated from the response and then used to search for the original sender 40 of the request 31 in the stored data. When a SessionID 41 and a JabberID (JID) 40 are stored for the received CSTA InvokeID 38, then the CSTA response 36 is packed without the CSTA InvokeID in an IQ stanza 39, provided with the stored SessionID 41 and transmitted to the determined Jabber ID 40. Finally, the stored mapping of JabberID, SessionID and CSTA InvokeID can be deleted, and the CSTA InvokeID is again available for a new or different application.

Figure 4:
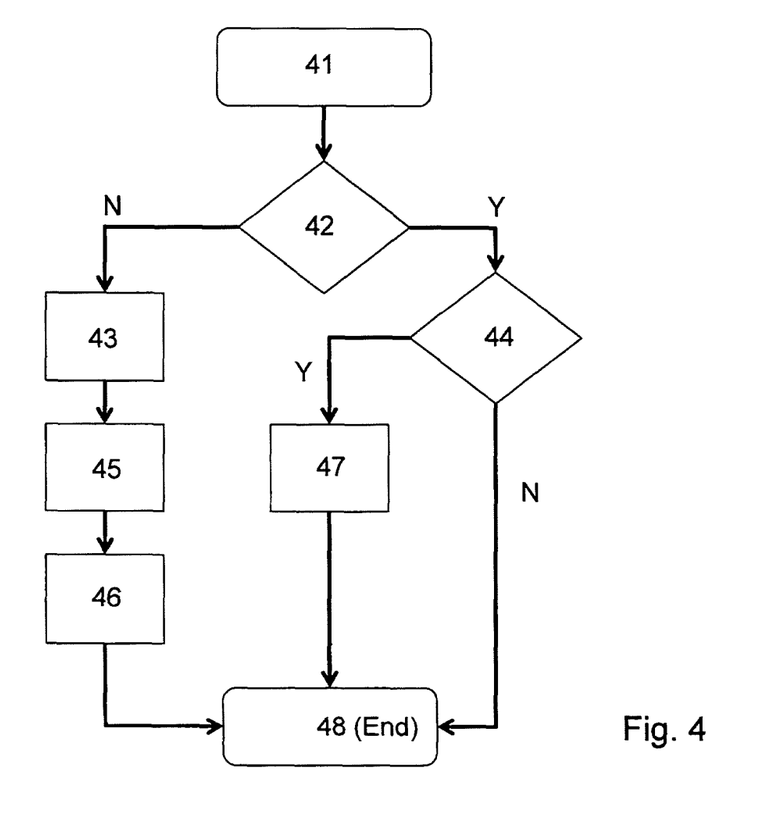
FIG. 4: schematically, first aspects of the sequence of a method according to an exemplary embodiment of the invention.
Figure 5:
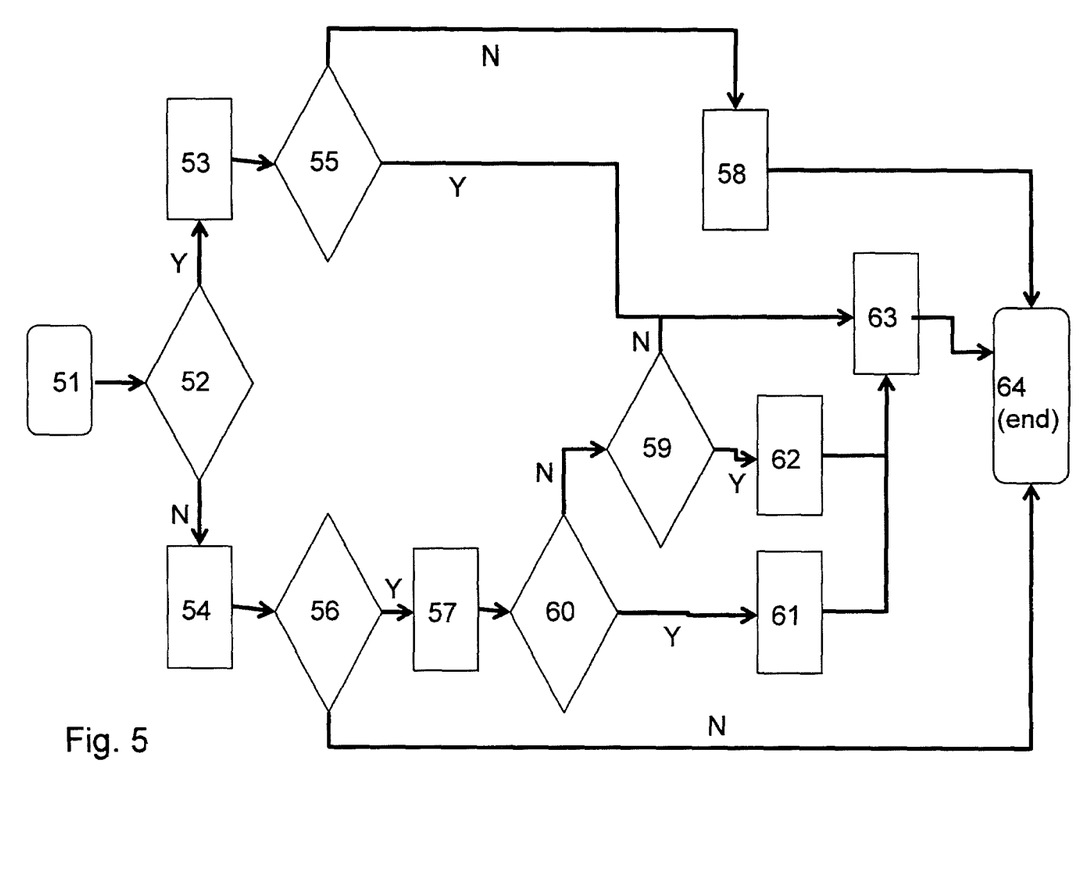
FIG. 5: schematically, second aspects of the sequence of a method according to an exemplary embodiment of the invention.

The CCGW establishes a connection to the CSP for a connection to the PBX. All CSTA services and events of all participating CSTA-capable XMPP clients are carried out via this one connection. This means that the CCGW receives the CSTA events of all XMPP clients and then has to make a decision about the XMPP client to which the received CSTA event should be forwarded. This applies similarly to CSTA Service Responses; because the CCGW accepts CSTA Service Requests from all connected XMPP clients and forwards them to the CSP; the respective CSTA Service Responses arrive also at the CCGW. After receiving such a CSTA Service Response, the CCGW must ensure that the CSTA Service Response is also delivered to the sender of the associated CSTA Service Request per XMPP. The CCGW procedure after receiving messages per XMPP or via the connection to the CSP, respectively, is shown in FIGS. 4 and 5. A detailed description of the mapping of CSTA Service Responses and CSTA events to the correct XMPP users is provided in the next two sub-sections.

When transporting CSTA via XMPP, the CSTA InvokeID is preferably not transmitted, because the InvokeIDs can overlap in case of multiple CSTA-capable XMPP clients. If two independent CSTA-capable XMPP clients send a CSTA Service Request simultaneously via XMPP to the CCGW and by chance use the identical InvokeID, then the CCGW cannot forward both CSTA Service Requests unchanged to the CSP, because this would render a unique correlation of the CSTA Service Response to the respective XMPP client impossible.

To bypass this problem of the lacking uniqueness, the CCGW preferably assigns unique CSTA InvokeIDs for all requests that it forwards to the CSP. All currently assigned InvokeIDs are stored in a list and supplemented by the JabberID of the sender and XMPP SessionID assigned by the sender. Even if it may be desirable to use XMPP exclusively as the means of transporting CSTA, an intervention beyond the actual transport is unavoidable in order to enable the correct delivery of CSTA Responses via XMPP.

When the CCGW receives a CSTA Service Response from the CSP, then the JabberID to which the responses must be forwarded as well as the XMPP SessionID that is to be used will be determined based on the InvokeID of the CSTA Service Responses from the list of all InvokeIDs. After forwarding the CSTA Service Response via XMPP, the dataset can be deleted from CSTA InvokeID, JabberID and XMPP SessionID. The CSTA InvokeID is now available for reuse. As can be seen in the example described above, the transfer of the InvokeID from the CSTA-capable XMPP client to the CCGW, since it is not used for delivering responses.

Delivering CSTA events via XMPP involves problems similar to those of delivering CSTA Service Responses. However, one difference is that a CSTA Service Request is not always transmitted by the CCGW in advance of an event. Instead, all CSTA events are identified using the InvokeID 9999. Thus, correlating a CSTA event to an XMPP user is not possible; instead, an additional list is required in the CCGW. In this list, an XMPP JabberID is correlated to this CSTA CrossRefID.

If the CCGW now receives a CSTA message with the InvokeID 9999 from the CSP, then it can identify this message as a CSTA event. The CSTA CrossRefID of the event is searched for in a subsequent step and can be used together with the list of known CrossRefIDs to determine the JabberID to which the event is to be forwarded. In order to populate the list of known CrossRefIDs, all CSTA Service Responses must be examined to determine whether they are MonitorStartResult Service Responses. If this is the case, the CrossRefID is separated from the message and is accepted into the list of known CrossRefIDs together with the JabberID to which the CSTA Service Response is forwarded.

Thereafter, the CSTA Service Response is simply delivered to the XMPP. To ensure that the list of known CrossRefIDs does not grow unnecessarily, the CSTA Service Responses are also examined for MonitorStopResults. Should this be the case, the CSTA CrossRefID is determined here as well and then the respective entry removed from the list of known CrossRefIDs. As an option, the CCGW can transmit a MonitorStop to the CSP automatically if the CrossRefID of an arriving CSTA event should not be present in the list of known CrossRefIDs in order to inhibit receiving additional, non-deliverable events in this manner.

The mechanism of the iq stanza takes effect if a CSTA-capable XMPP client is suddenly no longer available between the transmission of a service request and the receipt of the service response or at the moment when the CSP would like to deliver an event to it. Substituting for the addressed XMPP client that is no longer available, the XMPP server will respond to the CCGW with an iq stanza of the error type. This allows the CCGW to ignore subscribed events of the respective user using the list of known CrossRefIDs, and thus to avoid the transmission of unneeded events. Instead of waiting until an event occurs, it is also possible to use direct presence and thus to recognize even sooner whether a CSTA-capable XMPP client unexpectedly is no longer available.

Each XMPP user has a roster administered by the server. This roster is a list of friends or contacts that the user can populate with additional XMPP users. At the same time, the roster is used to administer the XMPP users with whom the owner of the roster intends to share his presence information (see RFC-6120 for details). If an XMPP user is not in the roster of another XMPP user, then he will not be informed automatically about that user's presence or the change in the presence status of the owner of the roster. One option for informing another XMPP user nonetheless about one's own presence status is for the owner of the roster to send the personal presence status (direct presence) to the other XMPP user. The additional particularity is that the addressee of the direct presence is not informed automatically about additional status changes, except when the roster owner logs out of the XMPP Server (or the connection between the addressee and the XMPP Server is terminated).

To enable this, each CSTA-capable XMPP client must transmit a direct presence to the CCGW in the course of logging into said CCGW. The CCGW can ignore this presence stanza. It is important, however, when the client logs out from his XMPP Server and the CCGW thus receives the presence stanza with the type "unavailable," even without being in the roster of the XMPP user. As soon as the CCGW receives such a presence stanza, it can ensure that the potentially existing monitor points of the respective XMPP user are cancelled, as was already described in the preceding paragraph.

Using a uniform and standardized stanza for transporting CSTA via XMPP ensures transparent transmission of CSTA-XML. The consistent application of standardized elements such as the iq stanza and additional XMPP and CSTA protocol parameters, as well as foregoing the use of proprietary expansions, are indicators of the stability of the architecture according to the invention.

FIG. 4 shows the sequence of forwarding an iq stanza received by the CCGW to the CSP. After the receipt 41 of an iq stanza from the namespace csta:query via XMPP, the stanza is examined 42 for the presence of an "error" type. If this is the case, an examination 44 determines whether the sender has monitor points. If this is not the case, the sequence is terminated 48. Otherwise, MonitorStop is transmitted 47 to the CSP for each monitor point. Then the sequence likewise concludes. If the result of the examination 42 is negative, a free InvokeID is determined 43. Thereafter, the SessionID and the JabberID are stored 45 at a selected InvokeID. Finally the message is prepared and transmitted 46 to the CSP. Then the sequence concludes 48.

In the sequence shown in FIG. 5, an examination 52 occurs after receiving 51 the CSTA message from the CSP if the InvokeID has the value 9999. If this is the case, then the event is one that receives a CrossRefID. Using this CrossRefID, the list of known CrossRefIDs is searched 53 for a JabberID. If the examination 55 to determine whether a CrossRefID was found has a positive result, then the message is prepared and transmitted 63 via XMPP. The sequence is then concluded 64. If the examination 55 to determine whether a CrossRefID was found has a negative result, then a MonitorStop with this CrossRefId is transmitted 58 to the CSP. The sequence is then concluded 64. If the examination 52 to determine whether the InvokeID has the value 9999 has a negative result, then the JabberID and the SessionID are determined 54 via the InvokeID. If an InvokeID is found 56, then this InvokeID is released for reuse 57. Otherwise the sequence is concluded 64. After releasing 57 the InvokeID for renewed use, an examination 60 is carried out to determine whether the received CSTA Service is in MonitorStartResult. If this is the case, the CrossRefID and the JabberID are inserted 61 into the list of monitor points. If this is not the case, an examination 59 is carried out to determine whether the received CSTA Service is in MonitorStopResult. If this is the case, the CrossRefID and the JabberID are deleted from the list of monitor points 62. Thereafter, the message is prepared and transmitted 63 via XMPP. Then the sequence concludes 64.

The invention claimed is:

1. A method for integrating functions of a telecommunications network into a data network, a switching system of the telecommunications network being connected to an instant messaging (IM) server of the data network via a device, the device configured such that computer telephony integration (CTI) services from the switching system is providable to a communications subscriber on the data network via the IM server, the method comprising:
providing the device such that CTI services of the switching system are subscribable by an IM client of the IM server via communication with the IM server, the IM client being an Extensible Messaging and Presence Protocol (XMPP) client;
wherein the device is configured to effect a dynamic allocation between a Computer Supported Telecommunications Applications (CSTA) InvokeID and at least one of a Jabber Identifier of the IM client and an XMPP SessionID to facilitate the CTI services to which the IM client is subscribable via communication with the IM server; and carrying out communication between the device and the IM server.

2. The method of claim 1, comprising:
performing, by the device, mapping between the CSTA InvokeID and the at least one of the Jabber Identifier of the IM client and the XMPP SessionID so that the CSTA InvokeID is not provided to the IM client in communications between the device and the IM client that relate to the request and the at least one of the Jabber Identifier of the IM client and the XMPP SessionID is not provided to the switching system in communications between the device and the switching system relating to the request.

3. The method of claim 2, comprising:
configuring communication between the device and the IM server as a server-server connection.

4. The method of claim 3, comprising:
configuring communication between the device and the IM server as a server-client connection.

5. The method of claim 3, wherein the carrying out of communication between the device and the IM server occurs via a server component selected from the group consisting of XEP 0114 and Jabber Component Protocol comparable to XEP 0114.

6. The method of claim 1, comprising:
creating, by the device, a CSTA InvokeID in response to receipt of a request received from the IM client via the IM server;
correlating, by the device, a response to the request that was received from a CSTA service provider via the created CSTA InvokeID.

7. The method of claim 6, wherein the CSTA InvokeID is created to be unique among all other requests received by the device and wherein the correlating is performed so that the CSTA InvokeID is not provided to the IM client in communications between the device and the IM client that relate to the request and the at least one of the Jabber Identifier of the IM client and the XMPP SessionID is not provided to the CSTA service provider in communications between the device and the CSTA service provider relating to the request.

8. The method of claim 6, wherein the request that is received by the device is in conformance with XMPP and uses info query (IQ) stanzas, said IQ stanzas having a request-response mechanism.

9. The method of claim 6, comprising:
creating, by the IM client, an XMPP SessionID that is different from other XMPP SessionIDs for the IM client; and
including, by the IM client, the created XMPP SessionID into the request prior to the IM client sending the request, the request having the XMPP SessionID included therein.

10. The method of claim 9, comprising:
storing, by the device, the XMPP SessionID from the request; and
associating, by the device, the stored XMPP SessionID with the created CSTA InvokeID;
communicating, between the device and the CSTA service provider via the created CSTA InvokeID after the XMPP SessionID is associated with the created CSTA InvokeID, the device providing the CSTA InvokeID to the CSTA service provider prior to receiving the response from the CSTA service provider during the communicating.

11. The method of claim 1, comprising:
evaluating, by the device, a request from the IM client to determine whether there is an indication of an error included in the request;
upon a determination that there is an error indicated in the request, the device communicating with the CSTA service provider to stop monitoring for the IM client;
upon a determination that the error is not indicated in the request, the device:
creating, the CSTA InvokeID for the request;
associating the CSTA InvokeID with a XMPP SessionID included in the request;
communicating with the CSTA service provider about the request via the created CSTA InvokeID after the XMPP SessionID is associated with the created CSTA InvokeID, the device providing the CSTA InvokeID to the CSTA service provider prior to receiving a response to the request from the CSTA service provider during the communicating such that the at least one of the Jabber Identifier of the IM client and the XMPP SessionID is not provided to the CSTA service provider in communications between the device and the CSTA service provider relating to the request.

12. The method of claim 11, comprising:
correlating, by the device, the response to the request that was received from a CSTA service provider via the created CSTA InvokeID so that the CSTA InvokeID is not provided to the IM client in communications between the device and the IM client that relate to the request.

13. The method of claim 12, comprising:
in response to receiving the response from the CSTA service provider, the device:
determining the XMPP SessionID associated with the CSTA InvokeID included in the response; and
determining whether monitors for the XMPP client exist and communicating with the CSTA service provider to stop the monitors when monitors for the XMPP client exist.

14. The method of claim 13, comprising:
forwarding, by the device, the response to the IM client after including the XMPP SessionID into the response; and
deleting, by the device, the stored XMPP SessionID after the forwarding of the response such that the CSTA InvokeID that was associated with the XMPP SessionID is available to be reused by the device.

15. The method of claim 14, wherein the request also includes the Jabber Identifier, the method also comprising:
associating, by the device, the CSTA InvokeID with the Jabber identifier included in the request;
determining, by the device, the Jabber Identifier associated with the CSTA InvokeID included in the response; and
including, by the device, the Jabber Identifier in the response received from the CSTA service provider prior to that response being forwarded to the IM client.

16. A communication system, comprising:
a device, the device configured to connect a switching system of a telecommunications network to an instant messaging (IM) server of a data network;
the device configured such that computer telephony integration (CTI) services from the switching system is providable to an IM client of the IM server, the IM client being an Extensible Messaging and Presence Protocol (XMPP) client;
the device configured to effect a dynamic allocation between a Computer Supported Telecommunications Applications (CSTA) InvokeID and at least one of a Jabber Identifier of the IM client and an XMPP sessionID to facilitate the CTI services to which the IM client is subscribable, the CTI services being providable via communications carried out between the device and the IM server.

17. The communication system of claim 16, wherein the device is configured to:
generate the CSTA specific InvokeID in response to receipt of a request received from an IM client via the IM server; and
correlate a response to the request that was received from a CSTA service provider via the created CSTA InvokeID.

18. The communication system of claim 17, wherein the device is configured to:
store an XMPP SessionID included in the request;
associate the stored XMPP SessionID with the CSTA InvokeID so that the CSTA InvokeID is not provided to the IM client in communications between the device and the IM client that relate to the request and the XMPP SessionID is not provided to the CSTA service provider in communications between the device and the CSTA service provider relating to the request; and
communicate with the CSTA service provider via the CSTA InvokeID after the XMPP SessionID is associated with the CSTA InvokeID, the CSTA InvokeID being providable to the CSTA service provider prior to the device receiving the response from the CSTA service provider during the communication with the CSTA service provider.

19. The communication system of claim 17, wherein the device is configured to:
evaluate the request to determine whether there is an indication of an error included in the request;
communicate with the CSTA service provider to stop monitoring for the IM client upon a determination that there is an error indicated in the request; and
upon a determination that there is no error indicated in the request, the device configured to generate the CSTA InvokeID for the request, associate the CSTA InvokeID with an XMPP SessionID included in the request, and communicate with the CSTA service provider about the request via the created CSTA InvokeID after the XMPP SessionID is associated with the created CSTA InvokeID, the device configured to provide the CSTA InvokeID to the CSTA service provider prior to receiving the response from the CSTA service provider during the communicating.

20. The communication system of claim 19, wherein, the device is also configured to:
(i) determine the XMPP SessionID associated with the CSTA InvokeID included in the response, (ii) determine whether monitors for the XMPP client exist and (iii) communicate with the CSTA service provider to stop the monitors when monitors for the XMPP client exist in response to receiving the response from the CSTA service provider; and
forward the response to the IM client after including the XMPP SessionID into the response; and
delete the stored XMPP SessionID so that the CSTA InvokeID that was associated with the XMPP SessionID is available to be reused by the device after forwarding the response to the IM client that included the XMPP SessionID.

* * * * *